United States Patent [19]

Lupke

[11] Patent Number: 4,545,751
[45] Date of Patent: Oct. 8, 1985

[54] APPARATUS FOR MOLDING OF PLASTIC TUBING

[76] Inventor: Manfred A. A. Lupke, 10 McLeary Ct., Concord, Ontario, Canada, L4K 2Z3

[21] Appl. No.: 645,277

[22] Filed: Aug. 29, 1984

[51] Int. Cl.⁴ ............... B29C 17/07; B29D 23/04
[52] U.S. Cl. .................. 425/72 R; 264/508; 425/526; 425/532; 425/326.1
[58] Field of Search ............... 264/508; 425/233, 525, 425/526, 532, 539, 326.1, 336, 369, 72 R

[56] References Cited

U.S. PATENT DOCUMENTS

| | | | |
|---|---|---|---|
| 1,952,281 | 3/1934 | Ranque | 62/170 |
| 3,173,273 | 3/1965 | Fulton | 62/5 |
| 3,208,229 | 9/1965 | Fulton | 62/5 |
| 3,981,663 | 9/1976 | Lupke | 425/396 X |

FOREIGN PATENT DOCUMENTS 1157558 7/1969 United Kingdom ............... 264/508

Primary Examiner—Jan Silbaugh

[57] ABSTRACT

Method and apparatus for molding of plastic tubing, including an elongate nozzle receiving an extrudate of an expandible plastic material under pressure from an extrusion head and a coaxial mandrel with air supply and evacuating passages communicating with a vortex generation tube for cooling air before its introduction to the interior of the formed tubing for its blowing and conforming to the walls of a tubular mold cavity formed by a series of forwardly moving molds.

1 Claim, 2 Drawing Figures

APPARATUS FOR MOLDING OF PLASTIC TUBING

This invention relates to methods and apparatuses for molding of plastic tubing, particularly corrugated tubing. Known such methods (e.g. U.S. Pat. No. 3,981,663) include the steps of continuous extruding a parison of an expandable plastic material, introducing the stream of pressurized air to the interior of said parison during the forward movement of the same for its blowing and conforming to the walls of a tubular mold cavity formed by a series of forwardly moving molds, cooling the formed tubing and discharging said air into the atmosphere. The apparatus for such blow molding (see the above patent) includes an elongate nozzle adapted for the attachment to an extrusion head for receiving an extrudate of an expandable plastic material under pressure therefrom, said nozzle providing a supply passage extending in the longitudinal direction thereof for the delivery of said extrudate to the delivery end thereof, a mandrel disposed in substantially coaxial relation with said nozzle and defining therewith generally an annular extrusion orifice of diminishing interior dimensions, through which said extrudate can flow uninterruptedly and form a parison within the nozzle and around the mandrel, the latter having a pressurized air supply passage adapted for fluid communication with at least one vent positioned within said parison for introducing said air to the interior of the latter, said interior communicating with the atmosphere, and a tubular mold cavity formed by a series of forwardly moving molds. In the above apparatus, there are two air chambers within the parison: one chamber for expanding the latter and another chamber with cooling air to cool it.

The objective of the present invention is to simplify the design, to elevate the efficiency of cooling and therefore to increase the production rate or to shorten the tubular mold cavity.

The above objective is acheived by having only one cooling pressurized chamber wherein the cooling means is disposed and cools the air at the spot directly, with the minimum losses of the cooling capacity. In doing so, before introducing pressurized air into the interior of the parison for the expansion of the latter, said air is cooled by steps of accelerating and delivering the air flow into a vortex tube, causing the flow to spiral inward, expanding its central axial part to cool it with its peripheral part churning and heating up, directing said central part for said introducing to the interior of the parison and evacuating said peripheral part out of the vicinity of the parison.

This method is carried out in the apparatus in which the air passage of the mandrel communicates with a tangential inlet of a vortex generation tube adapted to churn and heat up its peripheral air stream and to expand and cool its central air stream, said tube having two axially disposed opposite outlets adapted to exhaust respectively said central and peripheral streams and to communicate accordingly with said vent and a hot air evacuating passage disposed within said mandrel.

A further distinguishing characteristic of the apparatus of the present invention lies in that said vortex tube is enclosed within an elongate housing attached to said mandrel and axially disposed within said parison, the housing defining a chamber having said vent and connected to said air supply and evacuating passages of the mandrel.

Various other objects, features and attendant advantages of the present invention will be more apparrant from the following detailed description considered in conjunction with the accompanying drawings in which.

Figure 1:
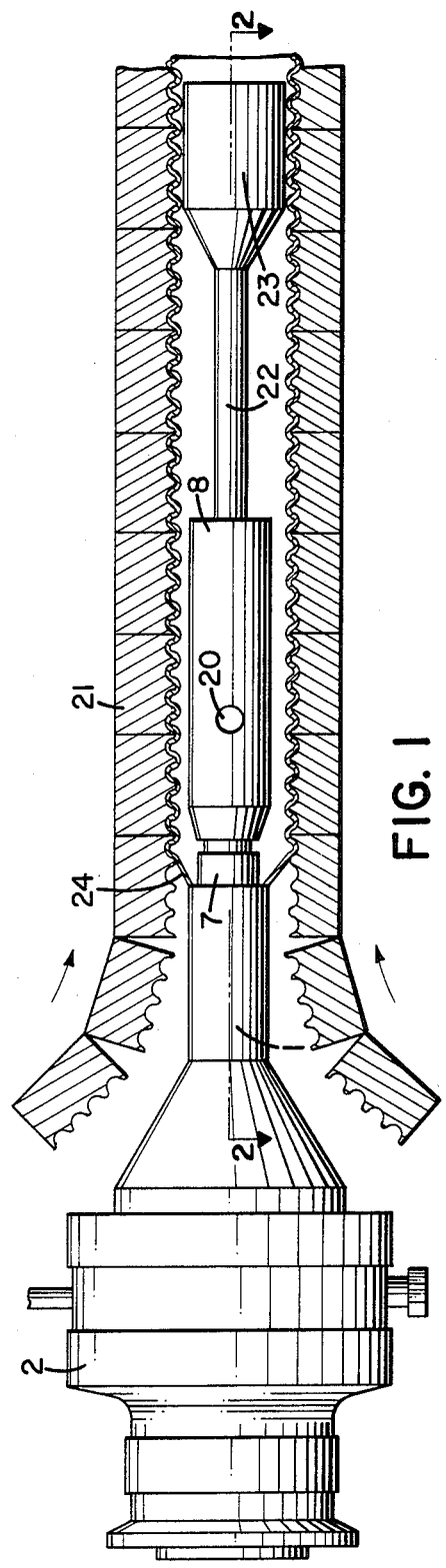
FIG. 1 is a sectional elevation of an apparatus of the present invention used in the production of corrugated thermoplastic tubing.
Figure 2:
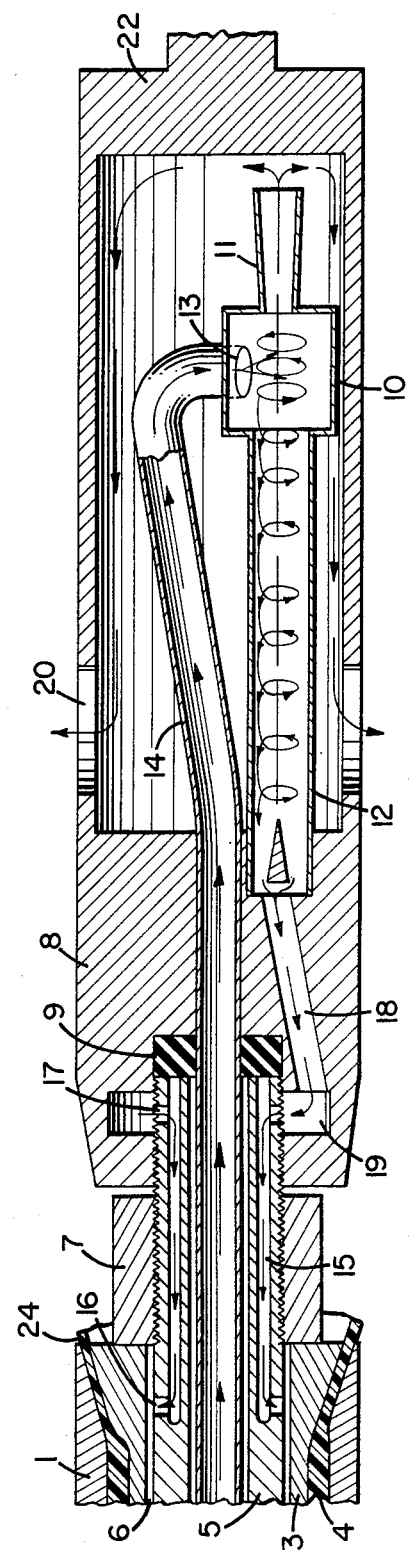
FIG. 2 is a sectional elevational view taken along line II—II of FIG. 1.

Referring now to the drawings, an apparatus of the present invention includes an elongate nozzle 1 attached to an extrusion head 2 and a hollow mandrel 3 disposed in substantially coaxial relation with the nozzle 1 and defined therewith generally an annular extrusion orifice 4 of diminishing interior dimensions. The head 2 is provided with heaters and sensors (not shown). Inside of the mandrel 3, a coaxial hollow stem 5 is placed with a gap 6 and fastened to the mandrel 3 with a nut 7. The stem 5 has a free threaded end screwed in an elongate housing 8 and sealed with a packing 9. The housing 8 encloses a vortex tube represented by a vortex chamber 10 disposed between its two opposite outlets 11 and 12. The periphery of the outlet 11 is restricted at the chamber. The center of the outlet 12 is restricted at its end, the outlet being attached to the housing 8. The end of the outlet 11 is free. The chamber 10 has a tangential inlet 13 connected to a pipe 14 communicated with a pressurized air supply source (not shown). It should be mentioned that the above design of the vortex tube is well known (see for example, U.S. Pat. Nos. 1,952,281; 3,173,273 and 3,208,229). The pipe 14 is disposed in the hollow of the stem 5 having elongate channels 15 in its wall with radial vents 16 and 17 to communicate with the gap 6 and with the outlet 12 via a channel 18 and a cavity 19 in the housing 8. The interior of the latter is provided with radial vents 20.

As already mentioned, the particular embodiment of this invention, is adapted for the production of corrugated thermoplastic tubing, for which a tubular mold cavity is formed by a series of forwardly moving molds 21 described, for example, in the mentioned U.S. Pat. No. 3,981,663.

To the free end of the housing 8 an extension rod 22 carrying a bullet 23 is attached. The latter is designed to restrict the discharge of the pressurized air from the interior of the formed plastic tube and to calibrate the same. Instead of the bullet 23, any other conventional restrictor can be used, for example, baffles of said U.S. Pat. No. 3,981,663.

It is clearly understood that a person skilled in the art could apply the same structure with different options, for example, vacuum can also be used from the exterior of the parison.

In operation, an extrudate of an expandable plastic material flows from the extruder uninterruptedly under pressure through the extrusion orifice 4 and form a parison 24 within the nozzle 1 and around the mandrel 3. Pressurized air is delivered into the chamber 10 via the pipe 14 and the inlet 13, accelerating the flow and injecting it tangentially. The vortex so created moves through the chamber 10 toward the outlet 12. Swirling air is heated up in the periphery of the vortex tube and is evacuated via the hot air exhaust passage created by the channel 18, the cavity 19, the vents 17, the channels 15, the vents 16 and the gap 6 into the atmosphere. The central air flow expands, cools, leaves the vortex tube through the cold outlet 11 and is introduced to the interior of the parison 24 via vents 20 of the housing 8

(more detailed description of the vortex tube is given in said U.S. Pat. Nos. 1,952,281; 3,173,273 and 3,208,229).

The bullet 23 forms an air pressurized chamber with the formed plastic tube, the air discharging into the atmosphere through a gap between the bullet and the tube. Under the pressure in said chamber, the parison conforms to the wall of the tubular mold cavity, the formed tube being cooled in the chamber.

It is to be understood that this description is exemplary and explanatory, but not restrictive, the invention being not limited to the specific details shown and described. Departures may be made without departing from the scope of the invention and without sacrificing its chief advantages.

Obviously many modifications and variations of the present invention are possible in light of the above teaching. It is therefore to be understood that within the scope of the appended claims, the present invention may be practiced otherwise than as specifically described herein.

What is claimed is:

1. An apparatus for molding of plastic tubing, including an elongate nozzle adapted for the attachment to an extrusion head for receiving an extrudate of an expandible plastic material under pressure therefrom, said nozzle providing a supply passage extending in the longitudinal direction thereof for the delivery of said extrudate to the delivery end thereof, a mandrel disposed in substantially coaxial relation with said nozzle and defining therewith generally an annular extrusion orifice of diminishing interior dimensions, through which said extrudate can flow uninterruptedly and form a parison within the nozzle and around the mandrel, the latter having a pressurized air supply passage communicating with at least one vent positioned within said parison for introducing said air to the interior of the latter, said interior communicating with the atmosphere, and a tubular mold cavity formed by a series of forwardly moving molds, characterized in that said air supply passage communicates with a tangential inlet of a vortex generation tube adapted to churn and heat up its peripheral air stream and to expand and cool its central air stream, said tube having two axially disposed opposite outlets adapted to exhaust respectively said central and peripheral streams and communicating accordingly with said vent and a hot air evacuating passage disposed within said mandrel, said tube being enclosed within an elongate housing attached to said mandrel, said housing being axially disposed within said parison and defining a chamber having said vent and connected to said supply and evacuating passages of the mandrel.

* * * * *